US012586296B2

(12) United States Patent
Wu et al.

(10) Patent No.: US 12,586,296 B2
(45) Date of Patent: Mar. 24, 2026

(54) METHODS AND PROCESSORS FOR RENDERING A 3D OBJECT USING MULTI-CAMERA IMAGE INPUTS

(71) Applicant: Shenzhen Yinwang Intelligent Technologies Co., Ltd., Shenzhen (CN)

(72) Inventors: Guile Wu, Markham (CA); Tongtong Cao, Markham (CA); Bingbing Liu, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 153 days.

(21) Appl. No.: 18/597,468

(22) Filed: Mar. 6, 2024

(65) Prior Publication Data

US 2025/0285364 A1     Sep. 11, 2025

(51) Int. Cl.
*G06T 15/20* (2011.01)
*G06T 7/00* (2017.01)
*G06T 19/20* (2011.01)

(52) U.S. Cl.
CPC .............. *G06T 15/205* (2013.01); *G06T 7/97* (2017.01); *G06T 19/20* (2013.01); *G06T 2219/2016* (2013.01)

(58) Field of Classification Search
CPC ......... G06T 15/205; G06T 7/97; G06T 19/20; G06T 2219/2016
USPC ...................................................... 345/427
See application file for complete search history.

(56) References Cited

U.S. PATENT DOCUMENTS

| | | | | |
|---|---|---|---|---|
| 2004/0126038 A1* | 7/2004 | Aublant | ............. | H04N 1/00281 |
| | | | | 707/E17.026 |
| 2022/0301252 A1* | 9/2022 | Wang | ..................... | G06N 3/048 |
| 2025/0148678 A1* | 5/2025 | Ranjan | .................... | G06T 13/40 |
| 2025/0182404 A1* | 6/2025 | Kreis | ...................... | G06T 17/00 |
| 2025/0191270 A1* | 6/2025 | Fu | ........................... | G06T 7/579 |

FOREIGN PATENT DOCUMENTS

| | | | | |
|---|---|---|---|---|
| CN | 118172470 A | * | 2/2024 | ............. G06T 15/20 |

OTHER PUBLICATIONS

Kerbl et al., 3D Gaussian Splatting for Real-Time Radiance Field Rendering, ACM Trans. Graph., vol. 42, No. 4, Article 1, Aug. 2023.
Xie et al., S-Nerf: Neural Radiance Fields for Street Views, Published as a conference paper at ICLR 2023, 2023.

* cited by examiner

*Primary Examiner* — Jin Ge
(74) *Attorney, Agent, or Firm* — Leydig, Voit & Mayer, Ltd.

(57) ABSTRACT

Methods and processors for rendering a 3D object are disclosed. The method includes acquiring multi-camera image input including first image frames of the 3D object generated by a first camera and second image frames of the 3D object generated by a second camera, acquiring an initial 3D Gaussian Splatting (3DGS) model having a plurality of initial parameters including an initial frame-wise GS parameter and an initial camera-wise GS parameter, generating an adjusted 3DGS model by adjusting, based on the multi-camera image input, at least one of: the initial frame-wise GS parameter, the initial camera-wise GS parameter, generating, by the adjusted 3DGS model, a 3DGS output and rendering a 2D image of the 3D object using the 3DGS output.

18 Claims, 6 Drawing Sheets

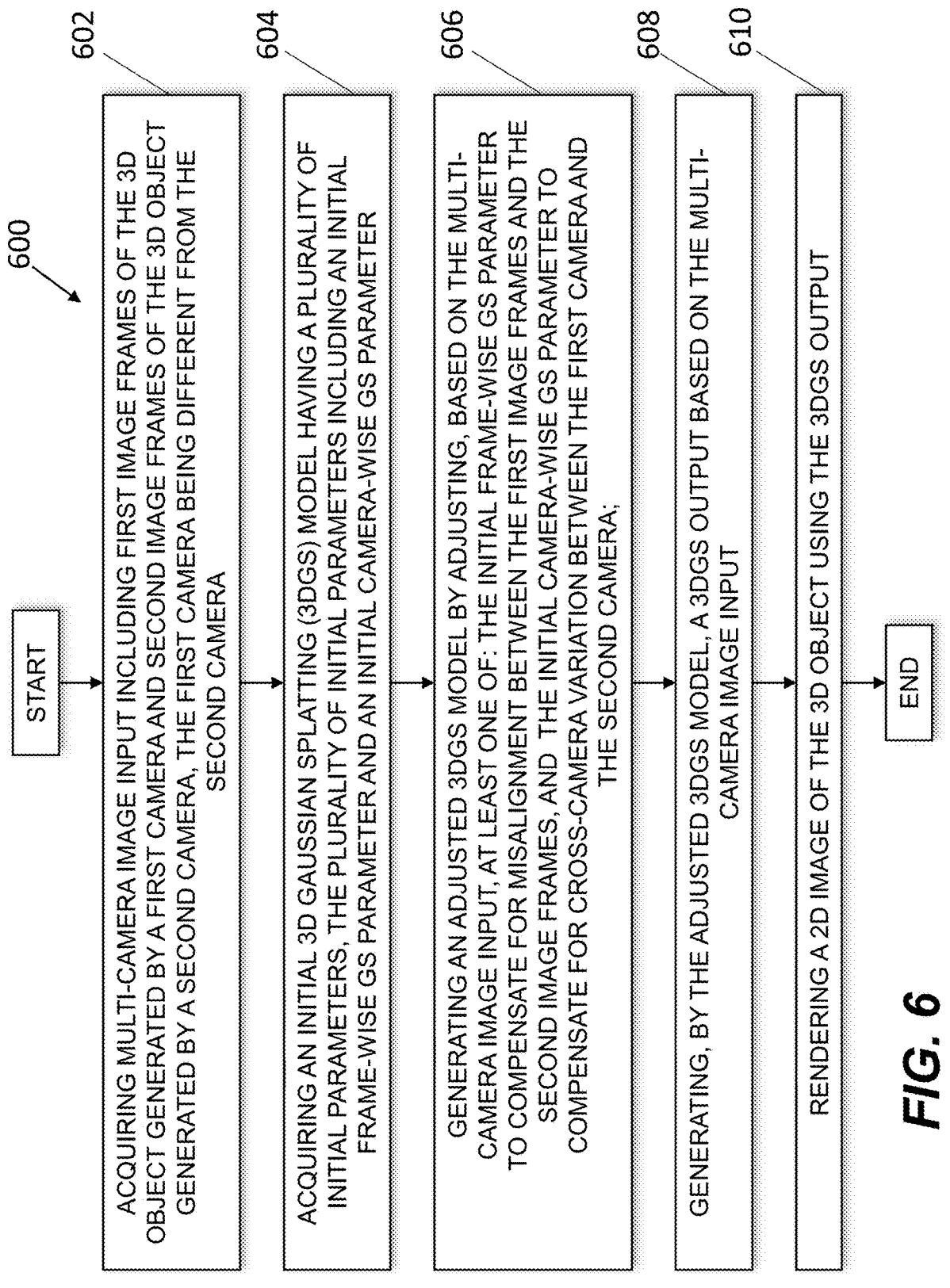

600

602 ACQUIRING MULTI-CAMERA IMAGE INPUT INCLUDING FIRST IMAGE FRAMES OF THE 3D OBJECT GENERATED BY A FIRST CAMERA AND SECOND IMAGE FRAMES OF THE 3D OBJECT GENERATED BY A SECOND CAMERA, THE FIRST CAMERA BEING DIFFERENT FROM THE SECOND CAMERA

604 ACQUIRING AN INITIAL 3D GAUSSIAN SPLATTING (3DGS) MODEL HAVING A PLURALITY OF INITIAL PARAMETERS, THE PLURALITY OF INITIAL PARAMETERS INCLUDING AN INITIAL FRAME-WISE GS PARAMETER AND AN INITIAL CAMERA-WISE GS PARAMETER

606 GENERATING AN ADJUSTED 3DGS MODEL BY ADJUSTING, BASED ON THE MULTI-CAMERA IMAGE INPUT, AT LEAST ONE OF: THE INITIAL FRAME-WISE GS PARAMETER TO COMPENSATE FOR MISALIGNMENT BETWEEN THE FIRST IMAGE FRAMES AND THE SECOND IMAGE FRAMES, AND THE INITIAL CAMERA-WISE GS PARAMETER TO COMPENSATE FOR CROSS-CAMERA VARIATION BETWEEN THE FIRST CAMERA AND THE SECOND CAMERA;

608 GENERATING, BY THE ADJUSTED 3DGS MODEL, A 3DGS OUTPUT BASED ON THE MULTI-CAMERA IMAGE INPUT

610 RENDERING A 2D IMAGE OF THE 3D OBJECT USING THE 3DGS OUTPUT

*FIG. 6*

METHODS AND PROCESSORS FOR RENDERING A 3D OBJECT USING MULTI-CAMERA IMAGE INPUTS

FIELD

The present technology relates generally to multi-camera rendering, and more specifically, to methods and processors for rendering a 3D object using multi-camera image inputs.

BACKGROUND

Image data may refer to images captured by image sensors such as cameras, for example. Autonomous vehicles may be retrofitted and/or equipped with inter alia camera sensors to gather image data about the environment, process the image data, and trigger one or more control actions to automatically control the vehicle's behavior in the environment. Road assets such as vehicles, pedestrians, trees, buildings, and the like, may be simulated in the environment for decision-making purposes and vehicle's behavior may be controlled in response thereto.

Gathering image data "in the wild" refers to the process of collecting image data from real-world scenarios, environments, or uncontrolled settings in which a given autonomous vehicle may operate. It should be noted that image data gathered in the wild may include information taken in natural surroundings, rather than in a controlled laboratory or studio environment, and therefore may suffer from variability, unpredictability, and other defects due to diverse operating and/or environmental conditions. For example, images captured in the wild may originate from multiple cameras, potentially of different types and/or having different Points of View (POVs), and therefore may not be aligned and/or may have different image styles across different cameras.

It should be noted that conventional simulation systems may comprise data-driven models to generate objects during simulation of the environment. Data-driven models may generate 3D objects in a more efficient manner and/or with a higher quality if compared to human-operated or "manual" methods. One example of a data-driven model includes a Neural Radiance Fields (NeRF) model built with a number of sequential Multi-Layer Perceptrons (MLPs), and/or large encoder-decoder modules.

However, known solutions for rendering images based on multi-camera image inputs still have many drawbacks when applied to processing autonomous driving image data in real-time and/or captured in the wild.

SUMMARY

Developers have devised methods and processors for overcoming at least some drawbacks present in prior art solutions.

In the context of the present technology, "multi-camera rendering" refers to a group of simulation techniques using data from multiple camera sensors to render real-world scenes and/or objects therein. These techniques may use one or more of data-driven models and hand-crafted patterns to render real-world scenes and/or objects therein.

In an article entitled "*S-Nerf: Neural Radiance Fields For Street Views*", authored by Ziyang Xie et al., and published in 2023, there is disclosed a neural rendering pipeline for performing neural rendering of multi-camera image data. Broadly, the neural rendering pipeline includes three steps: (i) employing multi-modal inputs (such as images, LiDAR points, optical flows, for example) to learn confidence maps of multi-camera inputs in the wild, (ii) employing a depth completion network to generate noisy dense depth map to facilitate learnable aggregation of different confidence maps, (iii) using multiple MLPs to construct a NeRF-based neural renderer to render RGB images and Depth maps.

However, developers have realized that neural rendering techniques require multi-modal inputs (not only camera inputs) to aggregate rich information of multi-camera inputs. Also, model architectures required for neural rendering are complex (e.g., including numerous encoder-decoder networks and/or NeRF architecture with numerous MLPs), resulting in low rendering speed of the road assets and are therefore ill-suited for and/or cannot support real-time rendering requirements in autonomous driving applications.

Some solutions for real-time rendering may employ a machine learning model implemented similarly to a machine learning model disclosed in an article entitled "3*D Gaussian Splatting for Real-Time Radiance Field Rendering*", authored by Bernhard Kerbl et al., and published on Aug. 8, 2023, the content of which is incorporated herein by reference in its entirety. For example, a 3D Gaussian Splitting (3DGS) rendering pipeline may include three steps: (i) initializing Gaussian points provided by a software application for aligning images and/or point clouds, and constructing of a 3DGS model with a set of parameters including a GS mean position parameter, a GS rotation parameter, a GS scale parameter, a GS opacity parameter and a GS Spherical Harmonics (SH) parameter, (ii) projecting 3D Gaussians onto image planes and using a differentiable tile rasterizer to render images, and (iii) employing density control mechanisms to clone and split Gaussians.

However, developers of the present technology have realized that an "off-the-shelf", or sometimes referred to as "vanilla", 3DGS models are not well suited for processing multi-camera inputs that are noisy (e.g., sparse and/or partial). It should be noted that image data captured in the wild may exhibit cross-camera inconsistency and/or variations. Therefore, vanilla 3DGS models are not well-suited for road asset simulation for autonomous driving applications using multi-camera inputs.

As it will be described in greater details herein further below, in some embodiments of the present technology, developers have devised an adjusted 3DGS model to enable real-time road asset simulation in autonomous driving using multi-camera inputs. In at least some embodiments, the adjusted 3DGS model may be generated using a first module to adaptively adjust a Gaussian position parameter of an initial 3DGS model to compensate for multi-camera pose alignment bias in the multi-camera inputs and/or to improve spatial-temporal Gaussian consistency. In at least some other embodiments, the adjusted 3DGS model may be generated using a second module to learn camera-dependent information to alleviate image style inconsistency among multiple cameras.

Developers have realized that an adjustable 3DGS model may be used instead of the initial 3DGS model in a wide range of simulators for simulating real-world scenes and/or objects therein. In one example, the adaptive 3DGS model can be implemented over an online cloud computing platform. In this example, the adaptive 3DGS model may be employed in a following pipeline: (i) users select and/or provide inputs of real-world data captured by multiple cameras and select the adjustable 3DGS model to simulate the inputs, (ii) the online cloud computing platform trains the adjustable 3DGS model to simulate the inputs, and (iii) simulated results are outputted to the users and/or the adaptive 3DGS model is optimized. In a second example, the adjustable 3DGS model can be implemented by robotic simulation systems. The adjustable 3DGS model may be used to support the optimization of data-driven simulators. Thus, different simulator systems may use the adaptive 3DGS model architecture as their basic model architecture to build the simulator system.

In a first broad aspect of the present technology, there is provided a method of rendering a 3D object. The method executable by a processor. The method comprises acquiring multi-camera image input including first image frames of the 3D object generated by a first camera and second image frames of the 3D object generated by a second camera, the first camera being different from the second camera. The method comprises acquiring an initial 3D Gaussian Splatting (3DGS) model having a plurality of initial parameters, the plurality of initial parameters including an initial frame-wise GS parameter and an initial camera-wise GS parameter. The method comprises generating an adjusted 3DGS model by adjusting, based on the multi-camera image input, at least one of: the initial frame-wise GS parameter to compensate for misalignment between the first image frames and the second image frames; and the initial camera-wise GS parameter to compensate for cross-camera variation between the first camera and the second camera. The method comprises generating, by the adjusted 3DGS model, a 3DGS output based on the multi-camera image input. The method comprises rendering a 2D image of the 3D object using the 3DGS output.

In some embodiments of the method, the generating the adjusted 3DGS model comprises adjusting both the initial frame-wise GS parameter and the initial camera-wise GS parameter.

In some embodiments of the method, the initial frame-wise GS parameter is an initial GS position parameter, and the initial camera-wise GS parameter is an initial GS Spherical Harmonics (SH) parameter.

In some embodiments of the method, the plurality of initial parameters further comprises a GS rotation parameter, a GS scale parameter, and a GS opacity parameter.

In some embodiments of the method, the adjusting the initial frame-wise GS parameter is executed in accordance with $\mu'=M_R\mu+M_T$, wherein $\mu$ is an initial frame-wise GS position parameter, $\mu'$ is an adjusted frame-wise GS position parameter, $M_R$ is a rotation matrix, and $M_T$ is a translation matrix.

In some embodiments of the method, the adjusting the initial camera-wise GS parameter is executed in accordance with $SH_d'=\beta_d SH+\gamma_d$, $SH_r'=\beta_r SH+\gamma_r$, wherein $\beta$ is a scaling factor, $\gamma$ is a bias factor, SH is the initial camera-wise GS SH parameter, $SH_d'$ is a 0th band of an adjusted camera-wise GS SH parameter, $SH_r'$ is a higher band of an adjusted camera-wise GS SH parameter.

In some embodiments of the method, the method further comprises using a Multi-layer Perceptron (MLP) model to optimize the rotation matrix and the translation matrix.

In some embodiments of the method, the method further comprises using a Multi-layer Perceptron (MLP) model to optimize the scaling factor and the bias factor.

In some embodiments of the method, the rendering comprises employing a differentiable renderer to project the 3DGS output onto a 2D plane.

In some embodiments of the method, the method further comprises generating a camera memory bank using the multi-camera image data, and generating a global camera index using the camera memory bank.

In a second broad aspect of the present technology, there is provided a processor for rendering a 3D object. The processing is configured to acquire multi-camera image input including first image frames of the 3D object generated by a first camera and second image frames of the 3D object generated by a second camera, the first camera being different from the second camera. The processing is configured to acquire an initial 3D Gaussian Splatting (3DGS) model having a plurality of initial parameters, the plurality of initial parameters including an initial frame-wise GS parameter and an initial camera-wise GS parameter. The processing is configured to generate an adjusted 3DGS model by adjusting, based on the multi-camera image input, at least one of the initial frame-wise GS parameter to compensate for misalignment between the first image frames and the second image frames, and the initial camera-wise GS parameter to compensate for cross-camera variation between the first camera and the second camera. The processing is configured to generate, using the adjusted 3DGS model, a 3DGS output based on the multi-camera image input. The processing is configured to render a 2D image of the 3D object using the 3DGS output.

In some embodiments of the processor, to generate the adjusted 3DGS model comprises the processor configured to adjust both the initial frame-wise GS parameter and the initial camera-wise GS parameter.

In some embodiments of the processor, the initial frame-wise GS parameter is an initial GS position parameter, and the initial camera-wise GS parameter is an initial GS Spherical Harmonics (SH) parameter.

In some embodiments of the processor, the plurality of initial parameters further comprises a GS rotation parameter, a GS scale parameter, and a GS opacity parameter.

In some embodiments of the processor, to adjust the initial frame-wise GS parameter is executed by the processor in accordance with $\mu'=M_R\mu+M_T$, wherein $\mu$ is an initial frame-wise GS position parameter, $\mu'$ is an adjusted frame-wise GS position parameter, $M_R$ is a rotation matrix, and $M_T$ is a translation matrix.

In some embodiments of the processor, to adjust the initial camera-wise GS parameter is executed in accordance with $SH_d'=\beta_d SH+\gamma_d$, $SH_r'=\beta_r SH+\gamma_r$, wherein $\beta$ is a scaling factor, $\gamma$ is a bias factor, SH is the initial camera-wise GS SH parameter, $SH_d'$ is a 0th band of an adjusted camera-wise GS SH parameter, $SH_r'$ is a higher band of an adjusted camera-wise GS SH parameter.

In some embodiments of the processor, the processor is further configured to use a MLP model to optimize the rotation matrix and the translation matrix.

In some embodiments of the processor, the processor is further configured to use a MLP model to optimize the scaling factor and the bias factor.

In some embodiments of the processor, to render comprises the processor configured to employ a differentiable renderer to project the 3DGS output onto a 2D plane.

In some embodiments of the processor, the processor is further configured to generate a camera memory bank using the multi-camera image data, and generate a global camera index using the camera memory bank.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6 is a scheme-block illustration of a method executed by a processor of the computing device of FIG. 1, in accordance with at least some non-limiting embodiments of the present technology.

Figure 1:
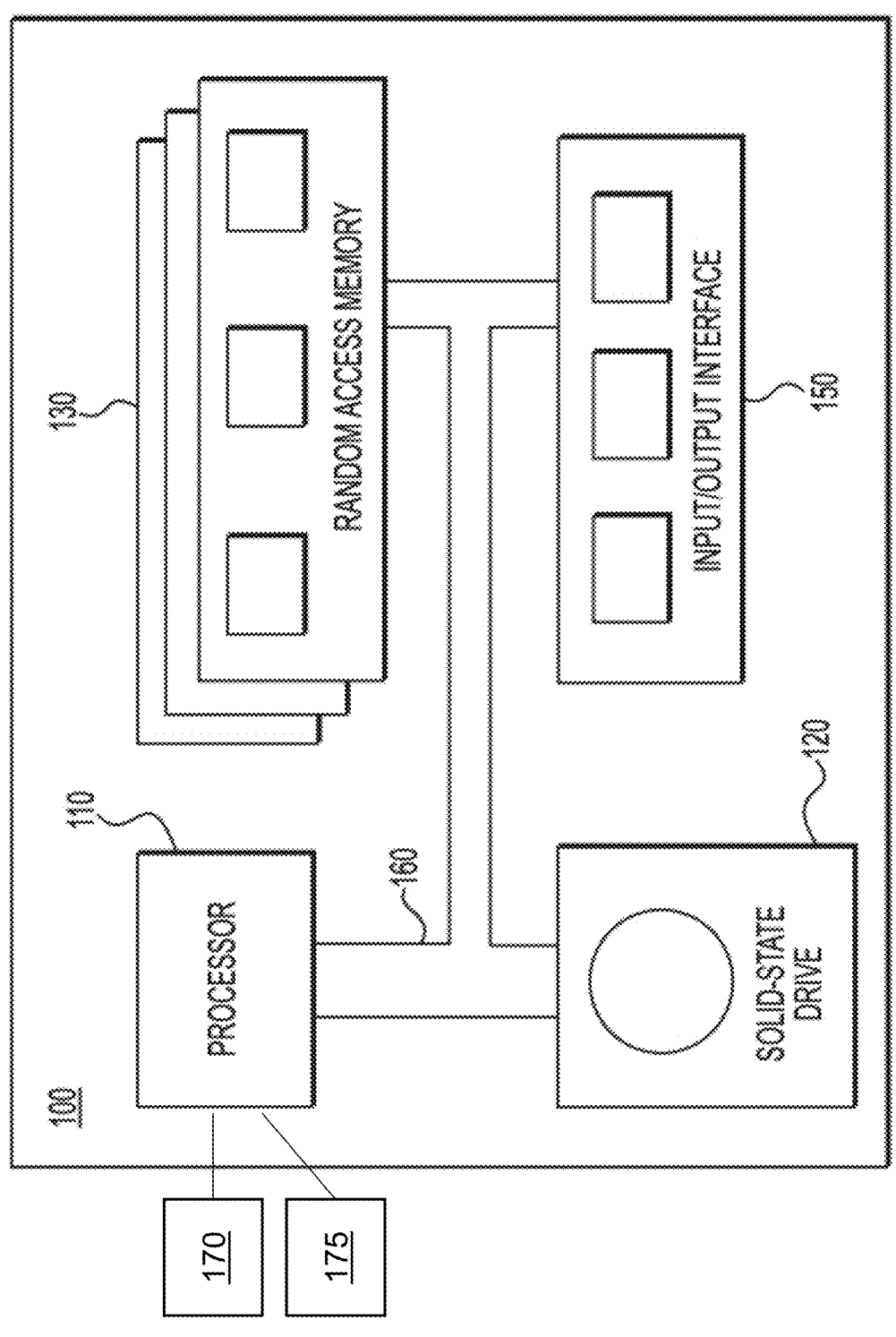
FIG. 1 illustrates an example of a computing device that may be used to implement any of the methods described herein.

Appendix A is a non-published article entitled "ADGauS: Autonomous Driving Road Asset Simulation with Adaptive Gaussian Splatting" which describes at least some non-limiting implementations of the present technology.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

In some embodiments of the present technology, the computing environment 100 may be communicatively coupled to one or more cameras (e.g., pinhole cameras, omnidirectional cameras, etc.) for receiving multi-camera inputs and/or communicatively coupled to one or more user devices in a cloud platform for receiving multi-camera inputs provided by users of the cloud platform. For example, the processor 110 may be configured to acquire data from a first camera 170 and from a second camera 175.

A pinhole camera is a type of camera that uses a small aperture (the pinhole) to capture images. Light passes through this tiny opening, forming an inverted image on a photosensitive surface located opposite the pinhole within a light-tight container.

An omnidirectional camera is a device that may be capable of capturing a full 360-degree field of view in all directions. Unlike traditional cameras that have a limited field of view, omnidirectional cameras use specialized lenses or multiple lenses arranged to capture a complete spherical or cylindrical image. These cameras are commonly used for virtual reality applications, autonomous driving, surveillance, immersive video experiences, and creating panoramic photographs or videos.

According to implementations of the present technology, the solid-state drive 120 stores program instructions suitable for being loaded into the random access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

Figure 2:
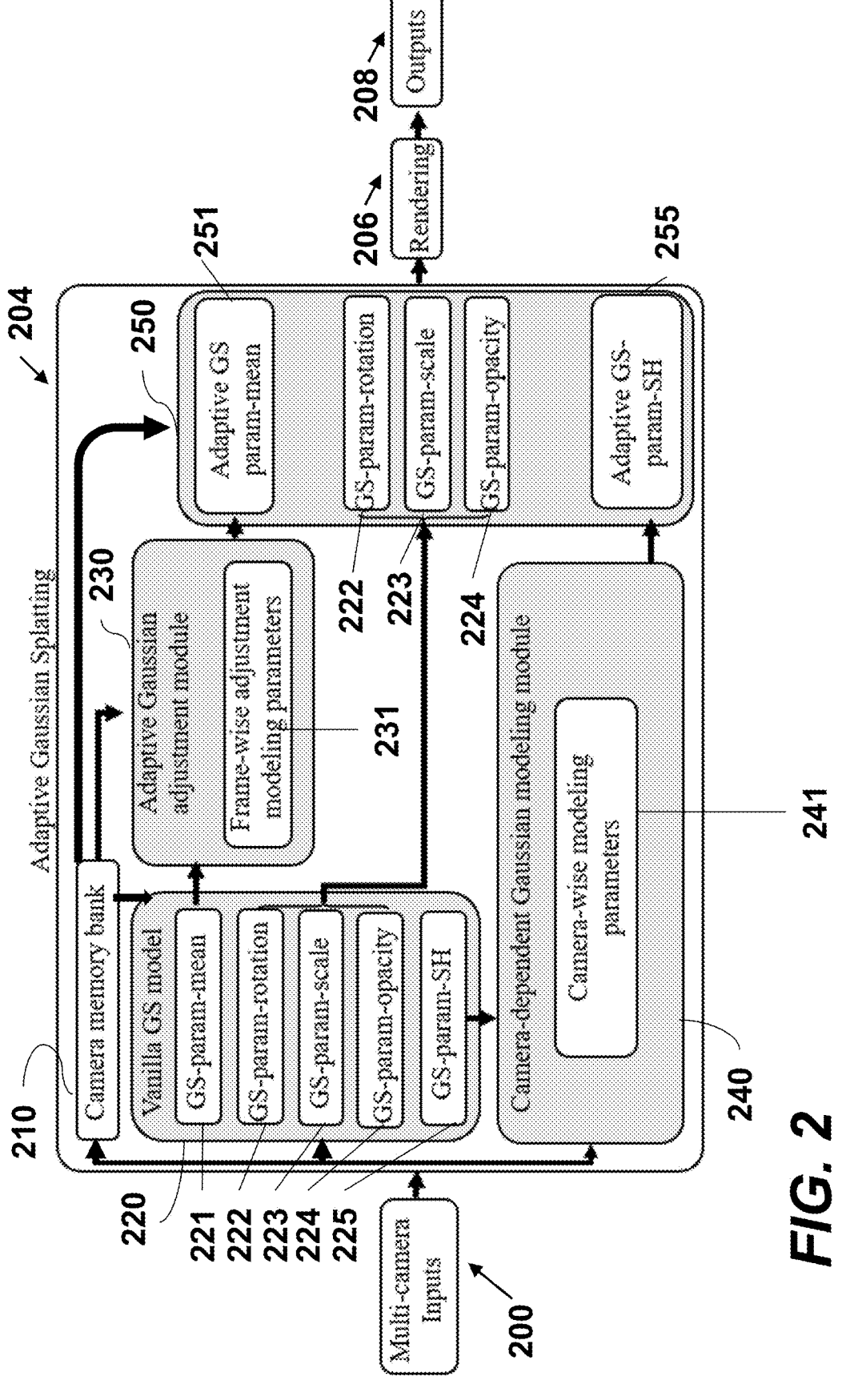
FIG. 2 illustrates a first processing pipeline for generating a first adjusted 3DGS model for rending a 3D object from multi-camera inputs, in accordance with a first non-limiting embodiment of the present technology.

With reference to FIG. 2, there is depicted a first processing pipeline 204 for generating a first adjusted 3DGS model 250 by the processor 110 of the computer environment 100. More particularly, the processor 110 may be configured to (i) acquire an initial 3DGS model 220, (ii) use at least one of an Adaptive Gaussian Adjustment (ADA) module 230 and a Camera-Dependent Gaussian Modeling (CDGM) module 240 for adjusting parameters of the initial 3DGS model 220, and thereby generating the adjusted 3DGS model 250.

It is contemplated that the initial 3DGS model 220 may implemented similarly to the 3DGS model disclosed in the article entitled "3D Gaussian Splatting for Real-Time Radiance Field Rendering". It can be said that the initial 3DGS model 220 may be a vanilla implementation of a given 3DGS neural architecture. In terms of a vanilla 3DGS model, it consists of learnable parameters of 3D Gaussians and a differentiable tile rasterizer, where each Gaussian is defined by a position (mean), a rotation, a scaling, an opacity, and a spherical harmonics.

In some embodiments, the initial 3DGS model 220 may be provided over a cloud platform to the processor 110 separately from, or in addition to, multi-camera input 200. The multi-camera input 200 comprises sequences of image frames generated by respective and distinct cameras. It is contemplated that the multi-camera inputs 200 may comprise a set of sequences of image frames captured by more than one camera.

Developers have realized that since the multi-camera input 200 is generated using different cameras in the wild usually, the image frames from different cameras are not aligned. As a result, during 3DGS learning, it may be desirable to implement the ADA module 230 to adaptively adjust Gaussian positions on respective image frames to compensate for multi-camera pose alignment bias in the multi-camera input 200 captured by multiple cameras in the wild and/or to improve spatial-temporal Gaussian consistency.

Developers of the present technology have also realized that the initial 3DGS model 220 is ill-suited for dealing with image inputs captured in the wild, since image styles may be different between different cameras due to illumination and/or sensor differences. As such, it may be desirable to implement the CDGM module 240 to learn camera-dependent information for compensating for image style inconsistency of the multi-camera input 200.

In some embodiments of the present technology, the processor 110 may be configured to generating a camera memory bank 210 for storing information in the multi-camera inputs 200. The processor 110 may generate the camera memory bank 210 to store image-wise camera information (e.g., camera extrinsic and camera intrinsic information). The processor 110 may also build an image index using the camera memory bank 210. For example, the image data may be organized in the image index based on at least one of (i) camera ID of the corresponding camera used to capture the image data, (ii) parameters of the corresponding camera, (iii) timestamp associated with image frames, and the like.

In some embodiments, the information stored in the camera memory bank 210 may be used by at least one of the initial 3DGS model 220, the AGA module 230, the CDGM module 240, and the adjusted 3DGS model 250. Additionally, or alternatively, the information stored in the camera memory bank 210 may be used by the processor 110 for selecting a nearest training view during rendering of novel views. Specifically, with a sequence of multi-camera input images captured from a self-driving vehicle, the processor 110 may be configured to build a camera memory bank $B_c$ to store image-wise camera information (i.e., extrinsic and intrinsic camera information). This camera memory bank $B_c$ is used by the processor 110 for selecting the nearest training view during rendering a novel view $v_n$, which can be formulated as $I=\arg \min D(v_n, B_c)$, where D measures the distance (e.g., angular distance) between two camera views while I is the index of the nearest view.

In some embodiments, the processor 110 may acquire the initial 3DGS model 220 with a plurality of original learnable neural network parameters including an initial GS mean position parameter $\mu \in \mathbb{R}^{n \times 3}$ which is used to control the location of each Gaussian 221, an initial GS rotation parameter $R \in \mathbb{R}^{n \times 4}$ which is used to control the rotation direction of each Gaussian 222, an initial GS scale parameter $S \in \mathbb{R}^{n \times 3}$ which is used to control the scale of each Gaussian 223, an initial GS opacity parameter $\alpha \in \mathbb{R}^{n \times 1}$ which is used to control whether the Gaussian splats can be seen or not 224, and an initial GS Spherical Harmonics (SH) parameter $SH \in \mathbb{R}^{n \times 3}$ which is used to control the colors of the Gaussian splats 225, where all these parameters are defined in a 3D space so associated with all 2D image sources, that is each 2D image or frame can be considered as a projected result of 3D Gaussian in each specific view. As it will be described in greater details herein further below, one or more initial GS parameters of the initial 3DGS model 220 can be selectively adapted for learning 3D information contained in the multi-camera input 200.

In some embodiments of the present technology, it can be said that PyTorch can used for executing training of one or more machine learning algorithms. Broadly, is a fully featured framework for building deep learning models, which is a type of machine learning that can be used in applications like image recognition and language processing. One or more neural network parameters can be learnable tensors in a PyTorch framework.

In some embodiments, the processor 110 may be configured to execute a learning process to adjusting a vanilla 3DGS model. Broadly, the learning process comprises the following set of steps: (i) acquiring multi-camera inputs, (ii) the vanilla 3DGS model learns Gaussian in a 3D space; (iii) the Gaussian is refined/adjusted; (iv) a rasterizer is used to render images and a loss is used to optimize the model (the adjusted model and/or the vanilla 3DGS model), and (v) repeat the steps (i)-(iv) until one or more stopping conditions are met.

It can be said that the initial GS mean position parameter 221 is a GS mean position parameter $\mu \in \mathbb{R}^{n \times 3}$ of the initial 3DGS model 220. Specifically, with multi-camera image inputs, they are used to learn u in a 3D space in an initial 3DGS model to control the location of each Gaussian so as to make the projection of 3D Gaussian onto each image plane consistent with each input image.

It can be said that the initial GS SH parameter 225 is a GS spherical harmonics parameter $SH \in \mathbb{R}^{n \times 3}$ of the initial 3DGS model 220.

In some embodiments, the AGA module 230 may be trained and/or used for generating an adjusted GS mean position parameter 251 for a given image frame based on the initial GS mean position parameter 221 of the initial 3DGS model 220 and information stored in the camera memory bank 210. Specifically, with a sequence of multi-camera input images captured from a self-driving vehicle, we first build a camera memory bank $B_c$ to store image-wise camera information (i.e., extrinsic and intrinsic camera information). This camera memory bank is used for selecting the nearest training view during rendering a novel view $v_n$, which is formulated as $I = \arg\min D(v_n, B_c)$, where D measures the distance (e.g., angular distance) between two camera views while I is the index of the nearest view. Then, based on I, the corresponding Ith $M_R$ and $M_T$ are used for transformation. It is contemplated that the processor 110 may be configured to, for each input frame, optimize a Gaussian position rotation matrix $M_R$ and a translation matrix $M_T$ to adaptively adjust a Gaussian u, in accordance with the following equation:

$$\mu' = M_R\mu + M_T \qquad (1)$$

wherein μ is the frame-wise Gaussian position, μ' is an adjusted frame-wise Gaussian position, $M_R$ is the rotation matrix, and $M_T$ is the translation matrix. It can be said that μ' is an adaptively adjusted Gaussian position parameter, and $M_R$ and $M_T$ can be implemented via learnable neural network parameters in the form of learnable tensors, which are consistent with the initial 3DGS model 220. The frame-wise adjustment modeling parameters are position rotation matrix $M_R$ and translation matrix $M_T$ for each frame, which represent the additional rotation and translation of each μ to make them consistent across multiple cameras.

In some embodiments, it can be said that a given camera memory bank may store the extrinsic and intrinsic camera information, and so for a given a rendering camera view, the given camera bank may be used to compute the distance between the rendering view and the training view in the given camera memory bank to determine which view from the camera memory bank is the nearest view. In turn, the processor 110 may use the nearest view to retrieve $M_R$ and $M_T$ for transformation purposes.

In some embodiment, the processor 110 may be configured to generate a global camera index using the camera memory bank 210. The CDGM module 210 may use the global camera index to optimize a camera-dependent Gaussian SH' with scaling factors β and bias factors Y, in accordance with the following equation:

$$SH_d' = \beta_d SH + \gamma_d \qquad (2)$$
$$SH_r' = \beta_r SH + \gamma_r \qquad (3)$$

wherein β is the scaling factor, γ is the bias factor, SH is the camera wise SHs, $SH_d'$ is a 0th band of the adjusted camera-wise SHs, $SH_r'$ is higher bands of the adjusted camera-wise SHs. It is contemplated that the processor 110 may be configured to separately adjust camera-dependent factors for different bands since they have different purposes and learning rates. It should be noted that each SH may have multiple degrees, where each degree corresponds to a respective band of rendering color results. For example, 0th band of SH corresponds to the low-frequency features while the other band of SH corresponds to the high-frequency features. It is also contemplated that the scaling factors β and bias factors γ can be implemented via learnable neural network parameters in the form of learnable tensors, which are consistent with the vanilla 3DGS model 220. The camera-wise modeling parameters are scaling factors β and bias factors γ for each camera, which represent the additional scaling and bias of each SH to make them specific to each camera so as to learn camera-dependent information.

IT is contemplated that the adjusted 3DGS model 250 may have the initial GS rotation parameter 222, the initial GS scale parameter 223, the initial GS opacity parameter 224 of the initial 3dGS model 220. In other words, a sub-set of initial GS parameters of an initial 3DGS model may remain unchanged when generating the adjusted 3DGS model.

During use, the adjusted 3DGS model 250 may be inputted with information stored in the camera memory bank 210, generate 3D outputs in the form of 3D Gaussians. Specifically, given an camera view, it is used to find the nearest camera view in the camera memory bank to retrieve an index I and then, based on I, the corresponding Ith $M_R$ and $M_T$ are used for transformation. Similarly, based on I, it can be conjectured the index of camera, i.e., which camera this camera view from, so the corresponding B and y are used for transformation as well.

In some embodiments, the processor 110 may be configured to employ a differentiable renderer to project 3D Gaussians onto a 2D image plane for executing an image rendering operation 206. Here, a differentiable renderer refers to the fast differentiable rasterizer for Gaussians introduced in the article entitled "*3D Gaussian Splatting for Real-Time Radiance Field Rendering*". Its main function is to render an 2D mage by projecting the given 3D Gaussians in a 3D space onto a 2D image plane with the given camera view.

It should noted that a differentiable renderer may be required for 3DGS models because images are rendered based on 3DGS model outputs. For example, during use, camera view matrix is provided, and the camera view matrix and the learned 3DGS model are used to render an image, which operation may a differentiable rasterizer.

In some embodiment, the processor 110 may generate outputs 208 corresponding to one or more 2D rendered images of a 3D object captured in image frames from the multi-camera image input 200.

Figure 3:
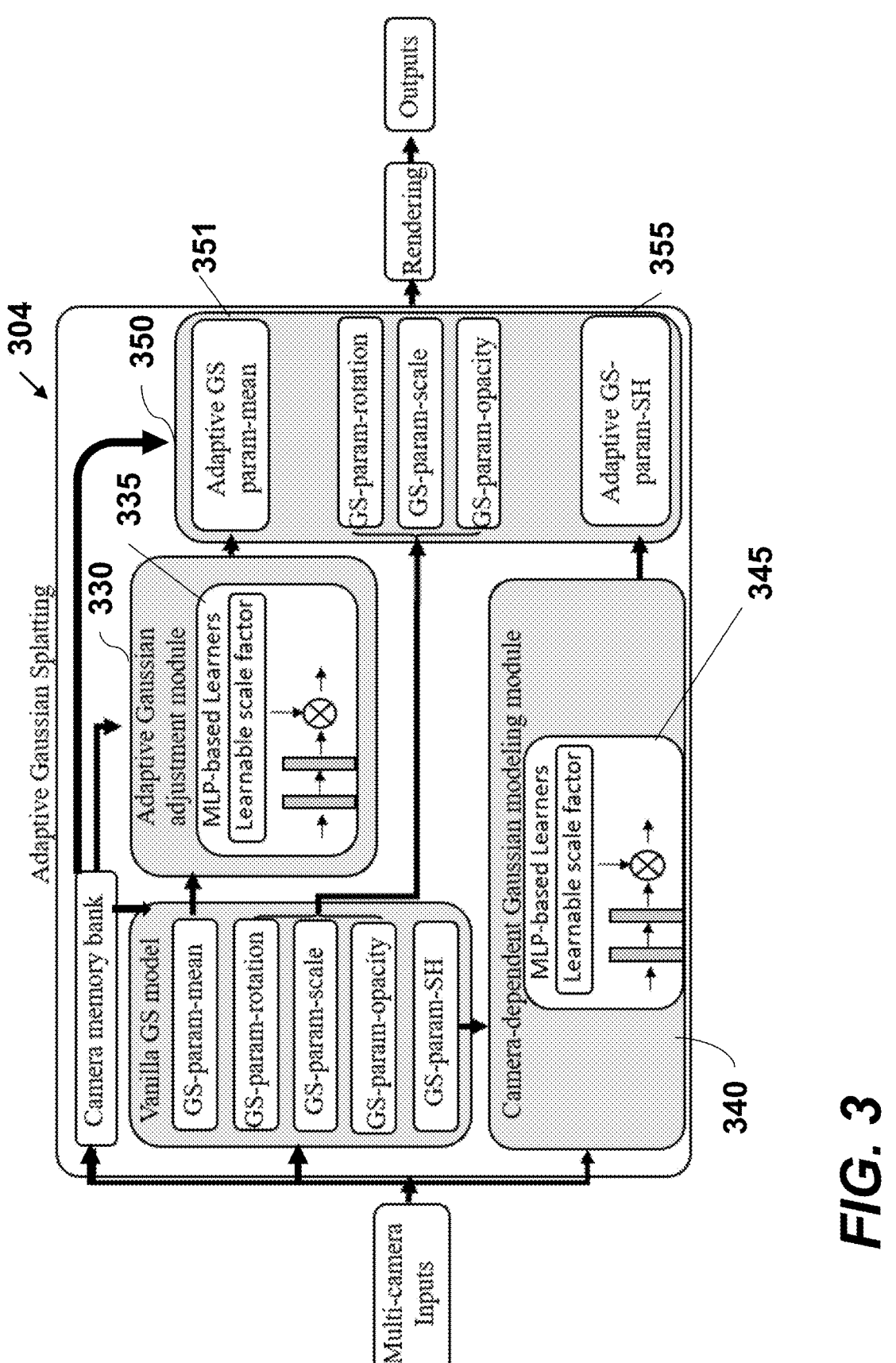
FIG. 3 illustrates a second processing pipeline for generating a second adjusted 3DGS model for rending the 3D object, in accordance with a second non-limiting embodiment of the present technology.

With reference to FIG. 3, there is depicted a second processing pipeline for generating an adjusted 3DGS model 350 by the processor 110 of the computer environment 100. In this embodiment, the processor 110 may be configured to use a second ADA module 330 instead of the ADA module 230, and a second CDGM module 340 instead of the CDGM module 240. In comparison to FIG. 2, instead of learnable using neural network parameters to implement the ADA module 230 and the CDGM module 240, the processor 110 may be configured to employ one or more MLP-based learning models to implement the second ADA module 330 and the second CDGM module 340.

In one embodiment, a given MLP-based learning model may comprise of a linear layer, an activation layer, another linear layer, and a learnable scale factor. Alternatively, an MLP may comprise of a number of sequential linear layers, activation layers and normalization layers, without departing from the scope of the present technology.

In the context of the other ADA module 330, the input to a MLP-based learning model 335 may be camera information accessed by the processor 110 from the camera memory bank 210 and the output of the MLA-based learning model may be $M_R$ and $M_T$ matrices for optimize a new Gaussian position $\mu'$. To optimize this model, a training objective L is formulated with an image loss, which is defined as $L=(1-\lambda_1)L1+\lambda_1 \times L_{D-SSIM}$, where L1 is the L1 loss between ground-truth images and rendered images, $L_{D-SSIM}$ is a D-SSIM term, and $\lambda$ is a weighting parameter. With this training objective loss and gradient backpropagation, the adaptive 3DGS model is trained from scratch with multi-camera input images to optimize a specific 3DGS model which can be used to render images of the object for different camera view.

In some embodiments, an optimization model may be trained to for simulation purposes on an autonomous vehicle. The multi-camera image inputs of this autonomous vehicle may be provided, and then the optimization model may be trained from scratch without using any pre-trained model during initialization, so the training dataset may only include the training images of this autonomous vehicle, as opposed to other autonomous vehicles. It is contemplated that a vanilla 3DGS model may be trained from scratch in combination with one or more modules disclosed herein, and therefore may not be pre-trained beforehand.

In the context of the other CDGM module 340, the input to a MLA-based learning model 345 may be camera information accessed by the processor 110 from the camera memory bank 210 and the output may be the scaling factors $\beta$ and bias factors $\gamma$ to optimize a new Gaussian color SH'. For example, parameters of the CDGM module 340 may be trained together from scratch using the defined training objective and the given multi-camera input images.

In an additional embodiment of the present technology, the adaptive Gaussian parameters may be updated with only scales factors $\beta$ or bias factors $\gamma$ instead of using both scales factors $\beta$ or bias factors $\gamma$. In other words, equations (2) and (3) can be defined as $SH_d'=\beta_d SH$ and $SH_r'=\beta_r SH$, or $SH_d'=SH+Ya$ and $SH_r'=SH+\gamma_r$.

Figure 4:
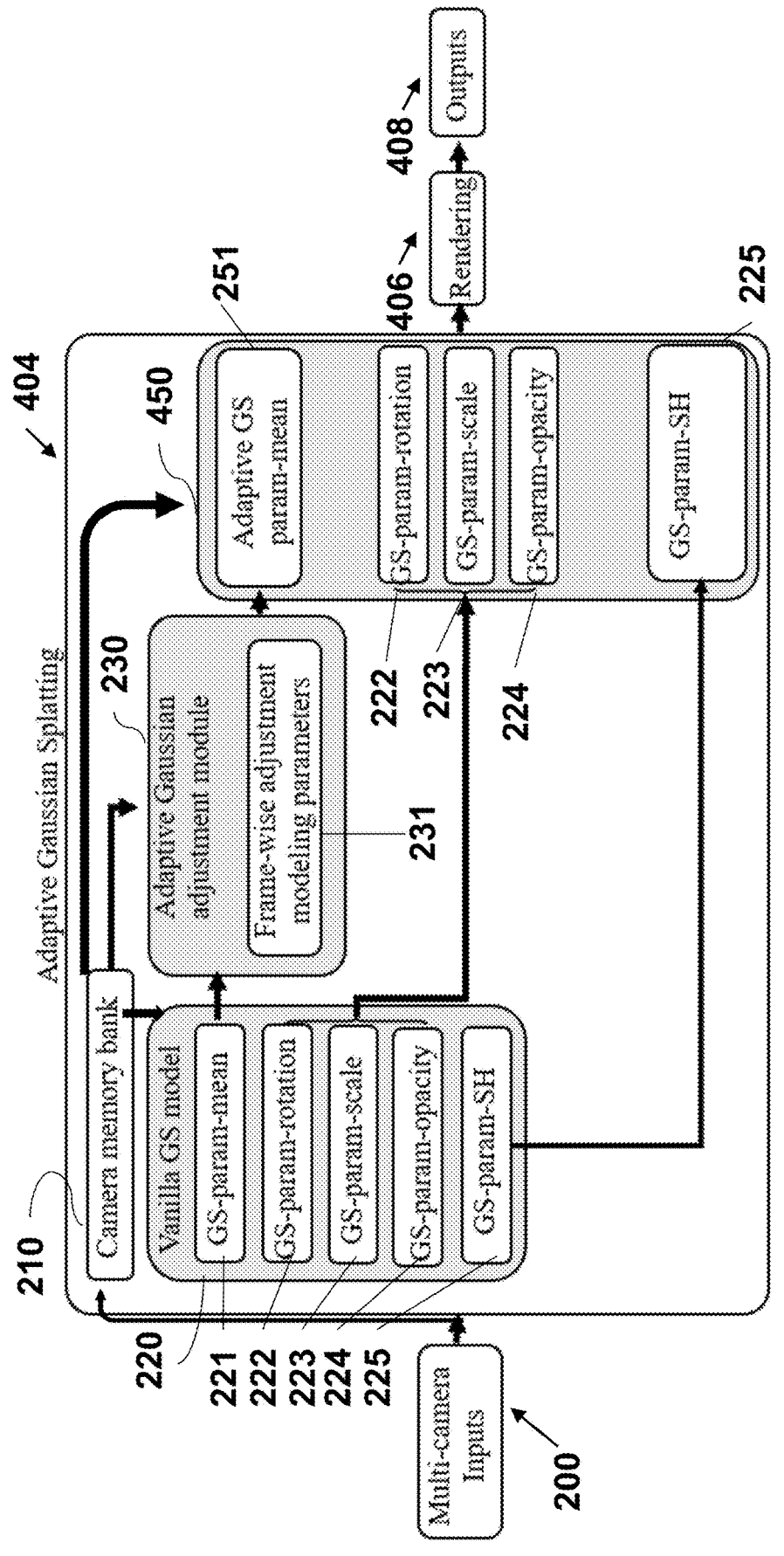
FIG. 4 illustrates a third processing pipeline for generating a third adjusted 3DGS model for rending the 3D object, in accordance with a third non-limiting embodiment of the present technology.

With reference to FIG. 4, there is depicted a third processing pipeline for generating an adjusted 3DGS model 450 by the processor 110 of the computer environment 100. In this embodiment, the processor 110 may be configured to generate the ADA module 230 (or the second ADA module 330). However, unlike the first and second processing pipelines, the third processing pipeline does not include a CDGM module. In this embodiment, the ADA module 230 may be used by the processor 110 to adjust the Gaussian mean position. However, the adjusted 3DGS model 450 may keep the initial SH parameter 225 from the initial 3DGS model 220.

In this embodiment, the processor 110 may be configured to adaptively adjust Gaussian positions to compensate multi-camera pose alignment bias and to improve spatial-temporal Gaussian consistency. Developers have realized that implementing a given ADA module may help in alleviating the misalignment problem caused by image data captured by multiple cameras in the wild, and therefore has a better performance than an initial 3DGS model for rendering more accurate 3D output results.

Figure 5:
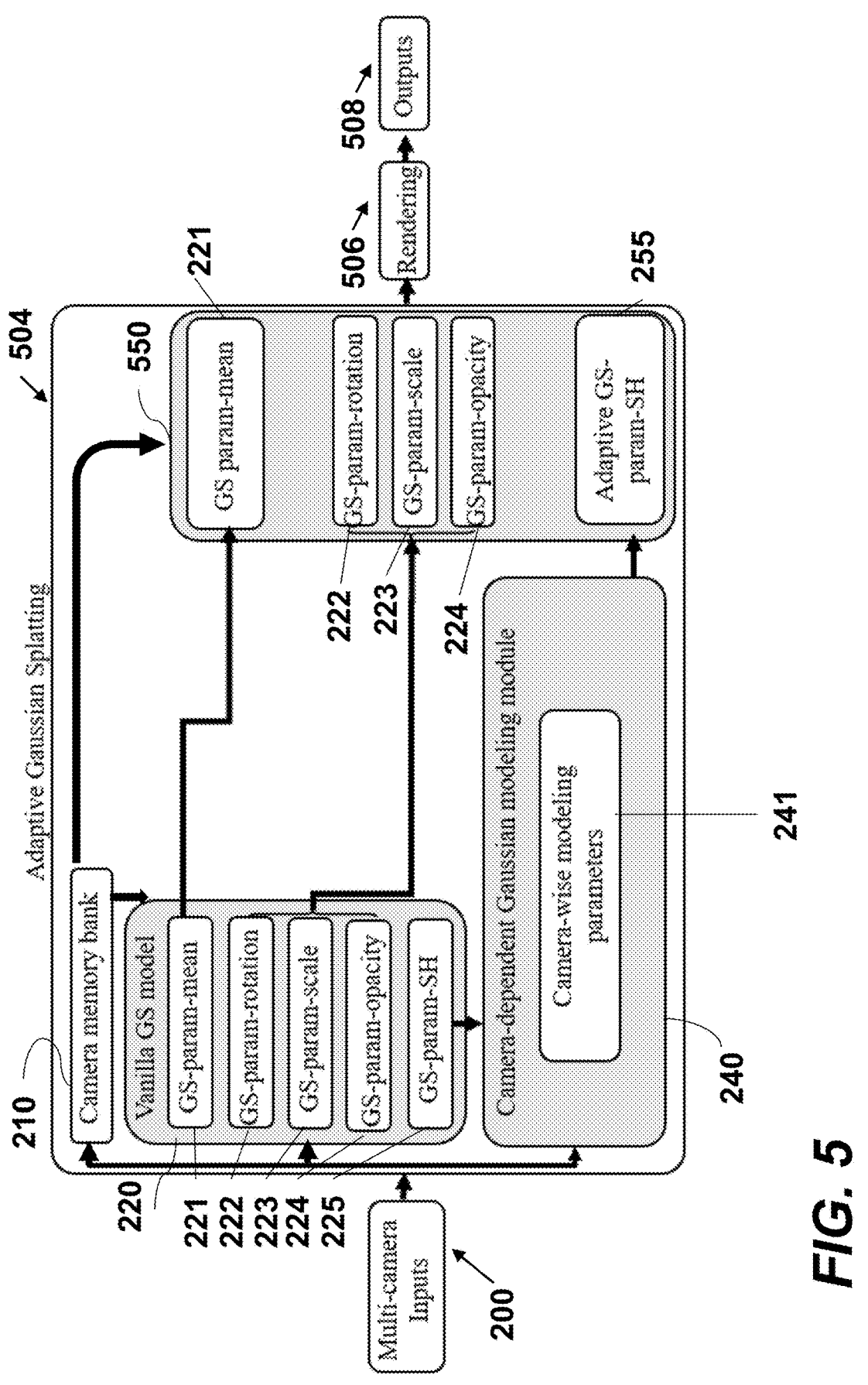
FIG. 5 illustrates a fourth processing pipeline for generating a fourth adjusted 3DGS model for rending the 3D object, in accordance with a fourth non-limiting embodiment of the present technology.

With reference to FIG. 5, there is depicted a fourth processing pipeline for generating an adjusted 3DGS model 550 by the processor 110 of the computer environment 100. In this embodiment, the processor 110 may be configured to generate the CDGM module 240 (or the second CDGM module 340). However, unlike the first and second processing pipelines, the fourth processing pipeline does not include an ADA module.

In this embodiment, the CDGM module 230 may be used by the processor 110 to adjust the GS SH parameter. However, the adjusted 3DGS model 550 may keep the original Gaussian mean position from the initial 3DGS model 220. In this embodiment, the processor 110 may be configured to learn camera-dependent information in an attempt to alleviate image style inconsistency among multiple cameras. Developers have realized that cross-camera style variation caused by illumination and/or sensor differences may be mitigated to improve on the initial 3DGS model to adaptively learn model diverse input image data across different cameras.

In some embodiments of the present technology, the processor 110 may be configured to execute a computer-implemented method 600 illustrated in FIG. 6. Various steps of the method 600 will now be described in greater details. Step 602: Acquiring Multi-Camera Image Input Including First Image Frames of the 3D Object Generated by a First Camera and Second Image Frames of the 3D Object Generated by a Second Camera, the First Camera being Different from the Second Camera The method 600 beings with the processor 110 configured to acquire a multi-camera image input 300 including first image frames of a 3D object generated by a first camera and second image frames of the 3D object generated by a second camera. The first camera is different from the second camera. For example, the first camera may be the camera 170, while the second camera may be the camera 175.

The multi-camera input 200 comprises sequences of image frames generated by respective and distinct cameras. It is contemplated that the multi-camera inputs 200 may comprise a set of sequences of image frames captured by more than one camera.

Developers have realized that since the multi-camera input 200 is generated using different cameras in the wild usually, the image frames from different cameras are not aligned. As a result, during 3DGS learning, it may be desirable to implement the ADA module 230 to adaptively adjust Gaussian positions on respective image frames to compensate for multi-camera pose alignment bias in the multi-camera input 200 captured by multiple cameras in the wild and/or to improve spatial-temporal Gaussian consistency. Developers of the present technology have also realized that the initial 3DGS model 220 is ill-suited for dealing with image inputs captured in the wild, since image styles may be different between different cameras due to illumination and/or sensor differences. As such, it may be desirable to implement the CDGM module 240 to learn camera-dependent information for compensating for image style inconsistency of the multi-camera input 200.

Step 604: Acquiring an Initial 3D Gaussian Splatting (3DGS) Model Having a Plurality of Initial Parameters, the Plurality of Initial Parameters Including an Initial Frame-Wise GS Parameter and an Initial Camera-Wise GS Parameter The method 600 continues to step 604 with the processor 110 configured to acquire the initial 3DGS model 220 having the plurality of initial parameters. The plurality of initial parameters includes an initial frame-wise GS parameter and an initial camera-wise GS parameter.

It can be said that the initial frame-wise GS parameter is the initial GS mean position parameter 221 of the initial 3DGS model 220. It can be said that the initial camera-wise GS parameter is the initial GS SH parameter 225 of the initial 3DGS model 220. In some embodiments, the initial frame-wise GS parameter is an initial GS position parameter, and the initial camera-wise GS parameter is an initial GS SH parameter. In some embodiments, the plurality of initial parameters further comprises a GS rotation parameter, a GS scale parameter, and a GS opacity parameter.

Step 606: Generating an Adjusted 3DGS Model by Adjusting, Based on the Multi-Camera Image Input, at Least One of: The Initial Frame-Wise GS Parameter to Compensate for Misalignment Between the First Image Frames and the Second Image Frames, and the Initial Camera-Wise GS Parameter to Compensate for Cross-Camera Variation Between the First Camera and the Second Camera The method 600 continues to step 606 with the processor 110 configured to generate an adjusted 3DGS model by adjusting, based on the multi-camera image input, at least one of: the initial frame-wise GS parameter to compensate for misalignment between the first image frames and the second image frames, and the initial camera-wise GS parameter to compensate for cross-camera variation between the first camera and the second camera.

In some embodiments, as illustrated in FIG. 2 or 3, the processor 110 may be configured to adjust both the initial frame-wise GS parameter and the initial camera-wise GS parameter for generating the adjusted 3DGS model 250 (FIG. 2) and/or for generating the adjusted 3DGS model 350 (FIG. 3).

In some embodiments, the processor 110 may be configured to adjust the initial frame-wise GS parameter is executed in accordance with the equation (1). In other embodiments, the processor 110 may be configured to adjust the initial camera-wise GS parameter in accordance with the equations (2) and (3).

In some embodiments of the present technology, the rotation matrix and the translation matrix may be optimized by the processor 110 using the MLP-based machine learning model 335 as seen in FIG. 3. In other embodiments, the scaling factor and the bias factor may be optimized by the processor 110 using the MLP-based machine learning model 345 as seen in FIG. 3.

Step 608: Generating, by the Adjusted 3DGS Model, a 3DGS Output Based on the Multi-Camera Image Input The method 600 continues to step 608 with the processor configured to generate, by the adjusted 3DGS model, a 3DGS output. It should be noted that the output of the adjusted 3DGS model may take the form of one or more 3D Gaussians computed based on the multi-camera input 200 by the adjusted 3DGS model.

Step 610: Rendering a 2D Image of the 3D Object Using the 3DGS Output

The method 600 continues to step 610 with the processor 110 configured to render a 2D image of the 3D object using the 3DGS output. To that end, the processor 110 may employ a differentiable renderer. In some embodiments, the processor 110 may be configured to employ a differentiable renderer to project 3D Gaussians onto a 2D image plane for executing the image rendering operation 206. In one embodiment, the differentiable renderer may be differentiable rasterizer for Gaussians introduced in the article entitled "*3D Gaussian Splatting for Real-Time Radiance Field Rendering*".

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method rendering a three-dimensional (3D) object, the method executable by a processor, the method comprising:

acquiring multi-camera image input including first image frames of the 3D object generated by a first camera and second image frames of the 3D object generated by a second camera, the first camera being different from the second camera;

acquiring an initial 3D Gaussian Splatting (3DGS) model having a plurality of initial parameters, the plurality of initial parameters including an initial frame-wise Gaussian Splatting (GS) parameter and an initial camera-wise GS parameter;

generating an adjusted 3DGS model by adjusting, based on the multi-camera image input, at least one of:

(i) the initial frame-wise GS parameter to compensate for misalignment between the first image frames and the second image frames; and (ii) the initial camera-wise GS parameter to compensate for cross-camera variation between the first camera and the second camera;

wherein the adjusting the initial frame-wise GS parameter is executed in accordance with:

$$\mu' = M_R\mu + M_T$$

wherein $\mu$ is an initial frame-wise GS position parameter, $\mu'$ is an adjusted frame-wise GS position parameter, $M\_R$ is a rotation matrix, and $M\_T$ is a translation matrix;

generating, by the adjusted 3DGS model, a 3DGS output based on the multi-camera image input;

rendering a two-dimensional (2D) image of the 3D object using the 3DGS output.

2. The method of claim 1, wherein the generating the adjusted 3DGS model comprises adjusting both the initial frame-wise GS parameter and the initial camera-wise GS parameter.

3. The method of claim 1, wherein the initial frame-wise GS parameter is an initial GS position parameter, and the initial camera-wise GS parameter is an initial GS Spherical Harmonics (SH) parameter.

4. The method of claim 1, wherein the plurality of initial parameters further comprises a GS rotation parameter, a GS scale parameter, and a GS opacity parameter.

5. A method rendering a three-dimensional (3D) object, the method executable by a processor, the method comprising:

acquiring multi-camera image input including first image frames of the 3D object generated by a first camera and second image frames of the 3D object generated by a second camera, the first camera being different from the second camera;

acquiring an initial 3D Gaussian Splatting (3DGS) model having a plurality of initial parameters, the plurality of initial parameters including an initial frame-wise Gaussian Splatting (GS) parameter and an initial camera-wise GS parameter;

generating an adjusted 3DGS model by adjusting, based on the multi-camera image input, at least one of:

(iii) the initial frame-wise GS parameter to compensate for misalignment between the first image frames and the second image frames; and (iv) the initial camera-wise GS parameter to compensate for cross-camera variation between the first camera and the second camera;

wherein the adjusting the initial camera-wise GS parameter is executed in accordance with:

$$SH_d' = \beta_d SH + \gamma_d,$$
$$SH_r' = \beta_r SH + \gamma_r,$$

wherein $\beta$ is a scaling factor, $\gamma$ is a bias factor, SH is the initial camera-wise GS SH parameter, $SH_d'$ is a 0th band of an adjusted camera-wise GS SH parameter, $SH_r'$ is a higher band of an adjusted camera-wise GS SH parameter;

generating, by the adjusted 3DGS model, a 3DGS output based on the multi-camera image input;

rendering a two-dimensional (2D) image of the 3D object using the 3DGS output.

6. The method of claim 1, wherein the method further comprises:

using a Multi-layer Perceptron (MLP) model to optimize the rotation matrix and the translation matrix.

7. The method of claim 5, wherein the method further comprises:

using a Multi-layer Perceptron (MLP) model to optimize the scaling factor and the bias factor.

8. The method of claim 1, wherein the rendering comprises employing a differentiable renderer to project the 3DGS output onto a 2D plane.

9. The method of claim 1, wherein the method further comprises:

generating a camera memory bank using the multi-camera image data; and generating a global camera index using the camera memory bank.

10. A processor for rendering a three-dimensional (3D) object, the processing being configured to:

acquire multi-camera image input including first image frames of the 3D object generated by a first camera and second image frames of the 3D object generated by a second camera, the first camera being different from the second camera;

acquire an initial 3D Gaussian Splatting (3DGS) model having a plurality of initial parameters, the plurality of initial parameters including an initial frame-wise Gaussian Splatting (GS) parameter and an initial camera-wise GS parameter;

generate an adjusted 3DGS model by adjusting, based on the multi-camera image input, at least one of:

(v) the initial frame-wise GS parameter to compensate for misalignment between the first image frames and the second image frames; and (vi) the initial camera-wise GS parameter to compensate for cross-camera variation between the first camera and the second camera;

wherein to adjust the initial frame-wise GS parameter is executed by the processor in accordance with:

$$\mu' = M_R\mu + M_T$$

wherein $\mu$ is an initial frame-wise GS position parameter, $\mu'$ is an adjusted frame-wise GS position parameter, $M_R$ is a rotation matrix, and $M_T$ is a translation matrix;

generate, using the adjusted 3DGS model, a 3DGS output based on the multi-camera image input; and render a two-dimensional (2D) image of the 3D object using the 3DGS output.

11. The processor of claim 10, wherein to generate the adjusted 3DGS model comprises the processor configured to adjust both the initial frame-wise GS parameter and the initial camera-wise GS parameter.

12. The processor of claim 10, wherein the initial frame-wise GS parameter is an initial GS position parameter, and the initial camera-wise GS parameter is an initial GS Spherical Harmonics (SH) parameter.

13. The processor of claim 10, wherein the plurality of initial parameters further comprises a GS rotation parameter, a GS scale parameter, and a GS opacity parameter.

14. The processor of claim 10, wherein to adjust the initial camera-wise GS parameter is executed in accordance with:

$$SH_d' = \beta_d SH + \gamma_d,$$
$$SH_r' = \beta_r SH + \gamma_r,$$

wherein $\beta$ is a scaling factor, $\gamma$ is a bias factor, SH is the initial camera-wise GS SH parameter, $SH_d'$ is a 0th band of an adjusted camera-wise GS SH parameter, $SH_r'$ is a higher band of an adjusted camera-wise GS SH parameter.

15. The processor of claim 10, wherein the processor is further configured to:

use a Multi-Layer Perceptron (MLP) model to optimize the rotation matrix and the translation matrix.

16. The processor of claim 14, wherein the processor is further configured to:

use a Multi-Layer Perceptron (MLP) model to optimize the scaling factor and the bias factor.

17. The processor of claim 10, wherein to render comprises the processor configured to employ a differentiable renderer to project the 3DGS output onto a 2D plane.

18. The processor of claim 10, wherein the processor is further configured to:

generate a camera memory bank using the multi-camera image data; and generate a global camera index using the camera memory bank.

* * * * *